M. JELALIAN.
SPRING CUSHION DEVICE FOR VEHICLE TIRES.
APPLICATION FILED MAR. 21, 1921.
1,393,377.
Patented Oct. 11, 1921.
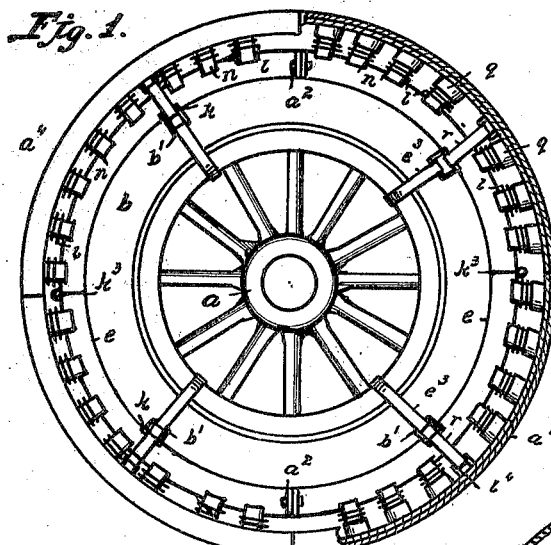
Fig. 1.
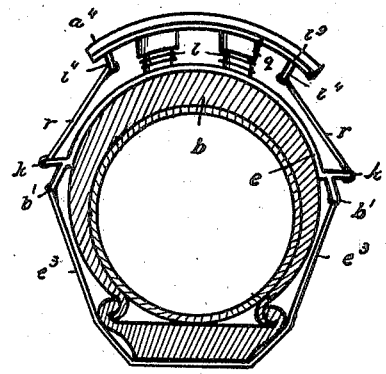
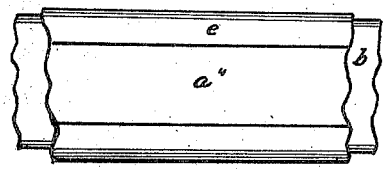
Fig. 3.
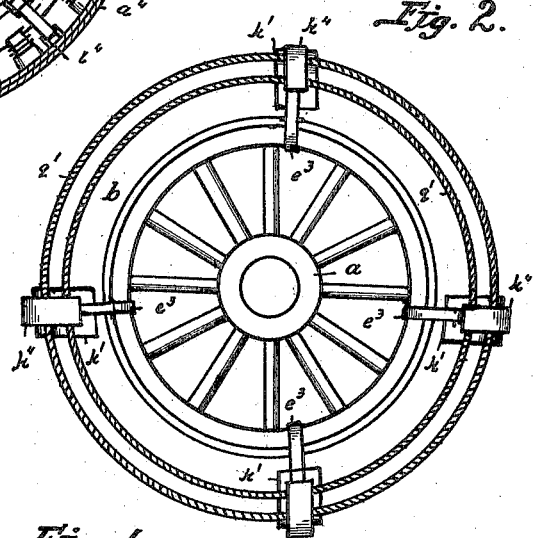
Fig. 2.
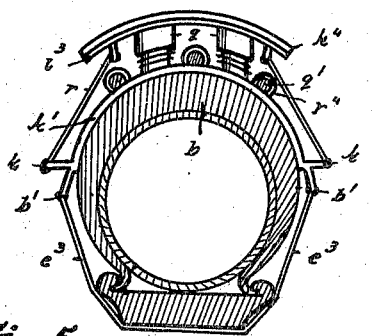
Fig. 5.
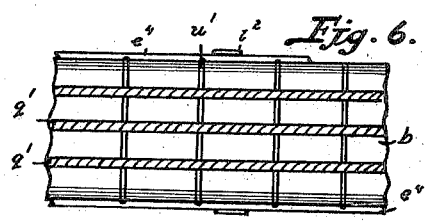
Fig. 6.
Fig. 4.
Witnesses:
James Shamirian
James Torosian
Inventor:
Martin Jelalian

UNITED STATES PATENT OFFICE.

MARTIN JELALIAN, OF CRANSTON, RHODE ISLAND.

SPRING-CUSHION DEVICE FOR VEHICLE-TIRES.

1,393,377. Specification of Letters Patent. Patented Oct. 11, 1921.

Application filed March 21, 1921. Serial No. 454,218.

*To all whom it may concern:*

Be it known that I, MARTIN JELALIAN, a citizen of the United States, residing at the city of Cranston, in the county of Providence and State of Rhode Island, have invented certain new and useful Improvements in Spring-Cushion Devices for Vehicle-Tires, of which the following is a specification.

This invention is an attachable spring cushion device for vehicle tires consisting of two opposite base members adapted to be secured to the tire and provided with cushioning arrangement to serve as a spring cushion for the latter and to prevent the same from wearing out.

The improvements are fully described in the following specification, illustrated by the accompanying sheet of drawings, in which like reference characters designate like parts. In the drawings:

Figure 1 is a side elevation of a vehicle wheel provided with a tire, illustrating the improved cushioning device as mounted thereon, and one of the opposite base members shown in section.

Fig. 2, an enlarged, transverse, sectional view, of Fig. 1. Fig. 3, an enlarged, fragmentary plan view of the device; Fig. 4, is a side elevational view, illustrating a modified form of the device; Fig. 5, is an enlarged, transverse, sectional view of Fig. 4; Fig. 6, is another modified form of arrangement of parts of the device.

Referring to the drawings, —a— designates a vehicle-wheel provided with the tire —b— to which the improved cushioning device is adapted to be applied.

Mounted upon the tire —b— are opposite base members —e, e— provided with projecting portions and bolted to one another as at —a², a²—.

Each base member —e, e— comprises two pivotally united slidable base support members —k³, k³— adapted to be secured to the tire —b— and having like sets of integral shafts —n, n— projecting from the outer faces thereof, and slidable guard rail members —l⁹, l⁹— which are provided with tubular members —q, q— and slidably mounted upon the end portions of the shafts —n, n— of the base support members —k³, k³—.

Coil spring —l, l— surround said shafts and having one of their ends secured to the slidable base support members —k³, k³— and the other ends attached to the end portions of the tubular members —q, q— of the slidable guard rail members —l⁹, l⁹— as shown by Fig. 1.

The device is attached to the wheel by bolting the complementary sections of the base members —e, e— together at —a², a²— and strapping them to the felly of the wheel.

For this latter purpose straps —e³, e³— are arranged, which are fastened at their ends to the base members —e, e— by hooks —b'—.

The base members of the complementary sections are also provided with outwardly projecting hooks —k, k— to receive straps —r, r— extending from hooks —l⁴, l⁴—, which project downwardly from the bottom faces of the slidable guard rail members —l⁹, l⁹— of the base members —e, e—, as shown by Fig. 2. Secured upon the top face of each of said base members —e, e— is a strip of layer —a⁴, a⁴—.

When the slidable guard rail members —l⁹, l⁹— of the base support members —e— are worn down they may be removed and replaced, by new ones in place thereof to provide new tread elements.

In Fig. 4, is shown a modified form of the device wherein the tread elements extend longitudinally of the tire. For this purpose a plurality of wire supporting base members —k', k'— are provided which are secured to the tire by straps —e³, e³— fastened at their ends to the felly of the wheel.

The wire supporting base members —k', k'— are provided with slidable shafts —q, q— and also coil spring connections —l, l— and strips of layers —k⁴— and strapping arrangement in the same manner as shown by Fig. 2.

Also provided upon said base-members —k'— are hooks —r⁴, r⁴—through which extend flexible wires —q', q'— which serve as a tread element.

The tread-wires as shown extend longitudinally of the tire and are spaced around its peripheral tread portion.

In Fig. 6 is shown another modified form of the device and wherein the flexible wires —q', q'— which serve as a tread element, are arranged in the same manner as shown by Fig. 4, and secured in place by transversely extending wires —u', u'— having their ends secured to the strips —e⁴, e⁴— which are placed against the sides of the tire —b— and extending around the outer circumference thereof and having straps —l², l²—for attachment.

What I claim as new and desire to secure by Letters Patent is:

1. In an attachable spring-cushion tread device for vehicle-tires, the combination with two base members adapted to be bolted together to extend longitudinally of the tire and encircle the same, each of said base members comprised of a pair of pivotally united sections having slidable shaft support members provided with slidable shaft projecting from the outer faces thereof, and also slidable guard rail members provided with tubes and slidably mounted upon the end portions of said slidable support members, coil springs encircling said shafts and having one of their ends secured upon the top face of said slidable shaft support members and the other ends attached to the end portions of the tubular members of said slidable guard rail members, hooks projecting inwardly from the latter, and having strap connections extending from said hooks to said slidable shaft support members, and also strap connections from the latter for attachment to the felly of the wheel of the vehicle.

2. In an attachable spring-cushion tread device for vehicle tires, comprised of two base members of pivotally united sections having slidable shaft support members provided with slidable shafts arranged in pairs projecting from the outer faces thereof and also slidable guard rail members provided with tubes and slidably mounted upon the end portions of said slidable shaft support members, coil spring connections between said slidable guard rail members and said slidable shaft support members of said base members a strip of layer extending upon the top face of each pair of said slidable guard rail members of said base members and strap connections from the latter to the hooks projecting outwardly from said slidable shaft support members.

In testimony whereof I affix my signature in presence of two witnesses.

MARTIN JELALIAN.

Witnesses:
JAMES SHAMIRIAN,
JAMES TOROSIAN.